United States Patent
Hansson

(10) Patent No.: US 6,244,780 B1
(45) Date of Patent: Jun. 12, 2001

(54) TOOL COUPLING HAVING SERRATED SURFACES ADAPTED TO BE PULLED INTO MESHING RELATIONSHIP

(75) Inventor: Per Hansson, Gävle (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/222,768

(22) Filed: Dec. 30, 1998

Related U.S. Application Data

(63) Continuation of application No. PCT/SE98/01513, filed on Aug. 25, 1998.

(30) Foreign Application Priority Data

Aug. 29, 1997 (SE) .................................................. 9703114

(51) Int. Cl.$^7$ .................................................. F16B 2/14
(52) U.S. Cl. .................. 403/374.3; 403/97; 409/234; 408/240; 279/67
(58) Field of Search .................. 403/97, 362, 374.1, 403/374.2, 374.3, 373, 217–219, 174, 178; 409/232, 234, 233; 408/239 A, 239 R, 240; 279/67, 98; 82/158, 160

(56) References Cited

U.S. PATENT DOCUMENTS

| | | | |
|---|---|---|---|
| 920,713 | * | 5/1909 | Auster .................................. 403/97 X |
| 3,901,613 | * | 8/1975 | Andersson ....................... 403/174 X |
| 4,221,142 | * | 9/1980 | Minder ................................... 82/158 |
| 4,632,614 | * | 12/1986 | Rall et al. ............................ 409/233 |
| 4,655,655 | | 4/1987 | Schürfeld . |
| 4,725,173 | | 2/1988 | Hoffman et al. . |
| 5,244,301 | * | 9/1993 | Kurke et al. ....................... 403/97 X |
| 5,555,784 | | 9/1996 | Muendlein et al. . |

FOREIGN PATENT DOCUMENTS

| | | |
|---|---|---|
| 30 26 513 | 1/1982 | (DE) . |
| 508454 * | 10/1920 | (FR) ..................................... 403/97 |

* cited by examiner

Primary Examiner—Harry C. Kim
(74) Attorney, Agent, or Firm—Burns, Doane, Swecker & Mathis, L.L.P.

(57) ABSTRACT

A tool coupling includes first and second bodies held together by a clamping mechanism. The first body includes a first surface having a first serration formed therein, a first hole extending through the first surface, and a side surface having a second hole extending therethrough and intersecting the first hole. The second body includes a second surface facing the first surface and including a second serration configured to mesh with the first serration. A drawbar projects from the second surface and extends into the first hole. The drawbar includes a plurality of wedge surfaces. The clamping mechanism includes a screw disposed in the second hole and nuts threadedly mounted thereon for movement toward and away from the drawbar. Each nut includes a plurality of wedge surfaces arranged to engage the wedge surfaces of the drawbar to pull the second body toward the first body in a manner bringing the first and second serrations into meshing engagement with one another.

8 Claims, 5 Drawing Sheets

Fig. 4
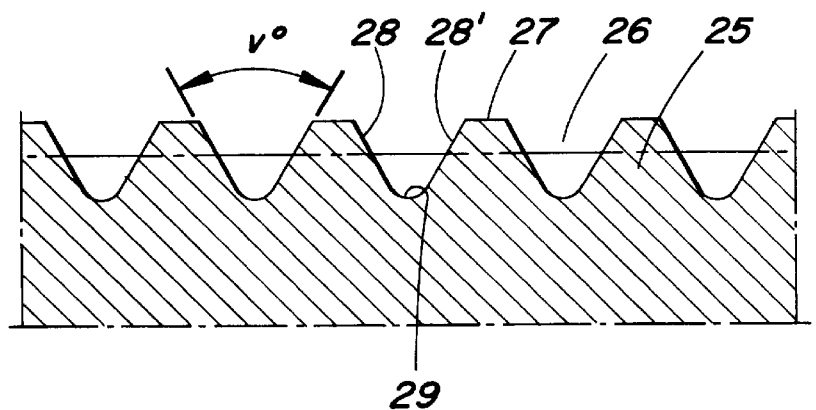
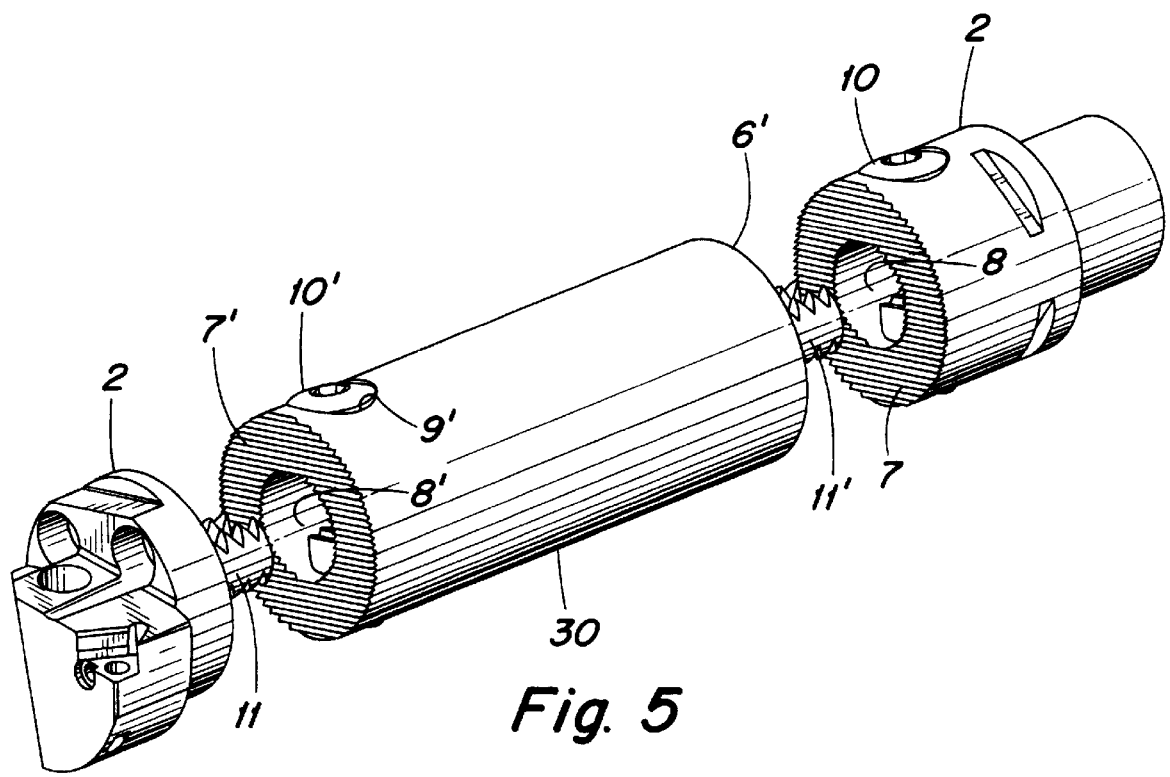
Fig. 5

TOOL COUPLING HAVING SERRATED SURFACES ADAPTED TO BE PULLED INTO MESHING RELATIONSHIP

RELATED INVENTIONS

This application is a Continuation Application of International Application No. PCT/SE98/01513 filed Aug. 25, 1998.

TECHNICAL FIELD OF THE INVENTION

This invention relates to a tool coupling of the kind that comprises a holder and an adapter for at least one cutting machining element, said adapter including a first serration intended to co-operate with a second serration of the holder, more precisely by bringing the serrations into engagement by means of a clamping means while providing a torque resistant connection between the adapter and the holder.

PRIOR ART

Within the field of chip removing machining there are tool couplings of the general kind defined above in several different applications, however, usually in turning tools of different type. Thus under the trade name COROMANT CAPTO® (Manufacturer: Sandvik AB, Sweden) boring bars are marketed, said boring bars utilizing such couplings. The holder of the coupling constitutes, for instance, a bar for receiving an adapter in the form of a cutting head, the coupling being mountable in a multipurpose lathe. The cutting head has one or more machining elements in the shape of exchangeable inserts. In connection with previously known boring bars of this kind, a first serration is provided at an essentially planar inner end surface of the cutting head, while a co-operating second serration is provided at an external or free end surface of the bar. In order to bring the serrations into engagement with each other several loose screws are used as clamping means, said screws having heads and being tightened in axial threaded holes disposed in the serrated end surface of the bar. More precisely, in this end surface of the bar four equidistant separated holes are recessed, of which the two upper holes permanently receive screws that are inserted through holes in the cutting head, and one or the other of the two lower holes receives a screw, depending on whether the cutting head is of a left-hand type or a right-hand type.

By urging together (meshing) the above-mentioned serrations in the two end surfaces of the bar and the cutting head respectively, a very reliable, torque resistant connection is achieved between the bar and the cutting head. This in turn guarantees that the active insert is given and maintains a correct position. However, a disadvantage in connection with the previously known tool coupling is that the exchange of the cutting head is complicated and time-consuming. Thus, not less than three screws must initially be loosened and then again tightened to complete a tool exchange, which might take several minutes. The tool exchanges become especially difficult in cases when the screws are hard to reach and/or have chips, dirt, grease deposits or the like in their key recesses. Under such circumstances the operational shutdowns for tool exchanges may be very time-consuming and expensive. Further, there is a risk of screws becoming lost since they must be loosened completely in order to allow dismounting of the cutting head.

Tool couplings using co-operating serrations in combination with screws as clamping means are further known from Publication WO 93/10929 and German Document No. 3 026 513. Even if the number of screws for fastening the adapter to the holder in these cases is reduced to one and two, respectively, the operation to initially loosen a comparatively long screw and then again tighten said screw, after a tool exchange has been effected, results in the exchange taking a comparatively long time. Also in this case the screws may become lost.

OBJECTS AND FEATURES OF THE INVENTION

The present invention aims at removing the shortcomings mentioned above in connection with previously known tool couplings of the type in question and at providing an improved coupling. Thus, a primary object of the invention is to create a tool coupling by means of which the necessary tool exchanges are effected in a quick and simple way. A further object is to create a tool coupling that makes it possible to design one and the same holder in such a way that it may be used in a flexible way not only for cooperation with different types of adapters, but also for positioning adapters in several different positions. Still a further object of the invention is to create a tool coupling where there is no risk of losing said clamping means.

According to the invention at least the primary object is attained by a tool coupling comprising first and second bodies, and a clamping mechanism. The first body includes a first surface having a first serration formed therein, a first hole extending through the first surface, and a side surface having a second hole extending therethrough and intersecting the first hole. The second body includes a second surface facing the first surface and including a second serration configured to mesh with the first serration. The second body further includes a pulling member projecting from the second surface and extending into the first hole. The pulling member includes at least one first wedge surface. The clamping mechanism is disposed in the second hole and includes a clamp member movable toward and away from the pulling member. The clamp member includes at least one second wedge surface arranged to engage the at least one first wedge surface to displace the second body toward the first body in a manner bringing the first and second serrations into meshing engagement with one another.

Preferably, the clamping mechanism includes a screw extending in the second hole and having a thread. The clamp member comprises a nut threadedly disposed on the thread of the screw for movement toward and away from the first hole in response to rotation of the screw.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 4 is a partial, enlarged cross-section showing a preferred geometrical Ishape of an individual serration;

FIG. 5 is a perspective exploded view illustrating how a separate spacing body may be incorporated in the tool coupling;

DETAILED DESCRIPTION OF PREFERRED EMBODIMENTS OF THE INVENTION

Figure 1:
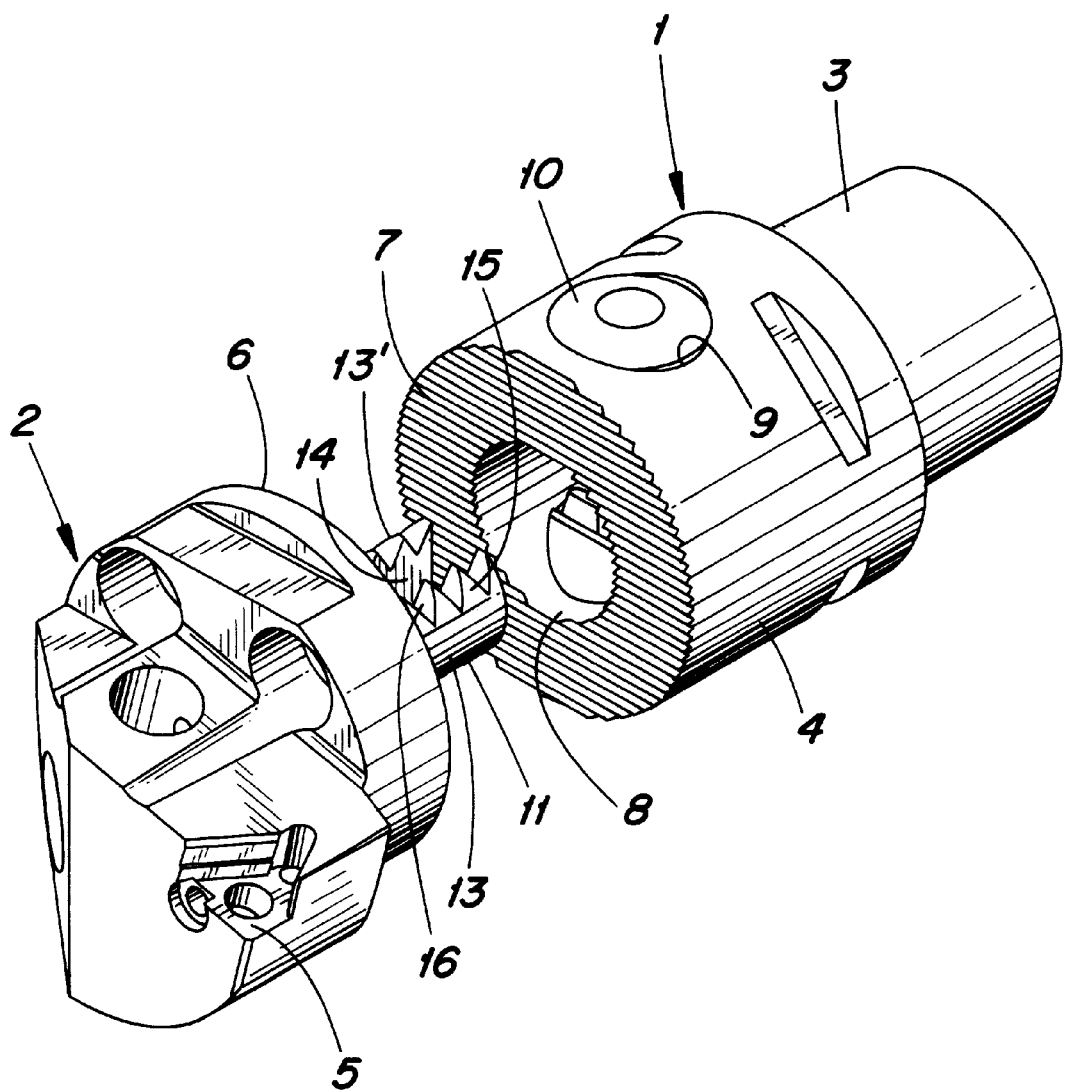
FIG. 1 is a perspective exploded view showing a tool coupling comprising a holder and an adapter in the shape of a cutting head, said holder as well as the adapter being schematically illustrated.
Figure 2:
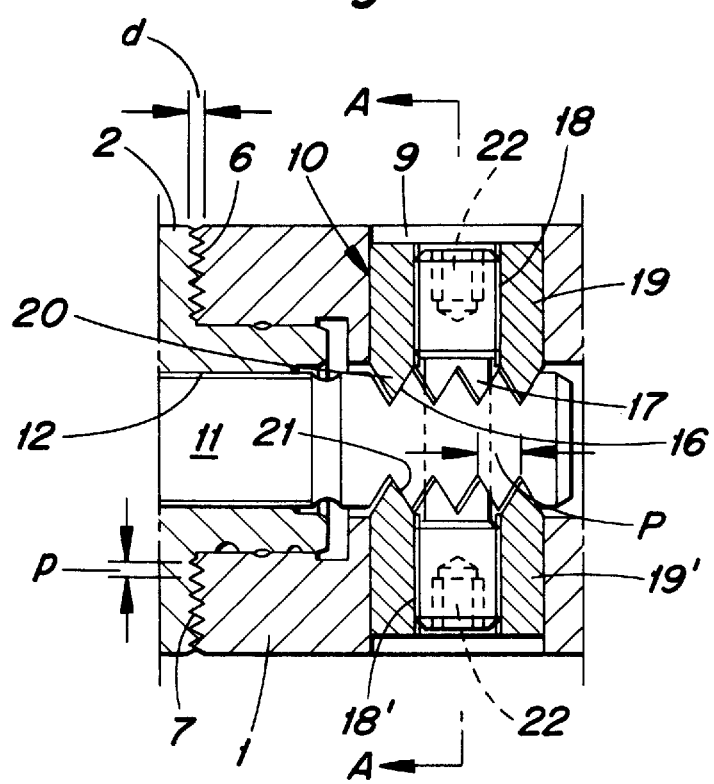
FIG. 2 is a partial longitudinal section through the tool coupling in a condition where the adapter is connected with the holder.
Figure 3:
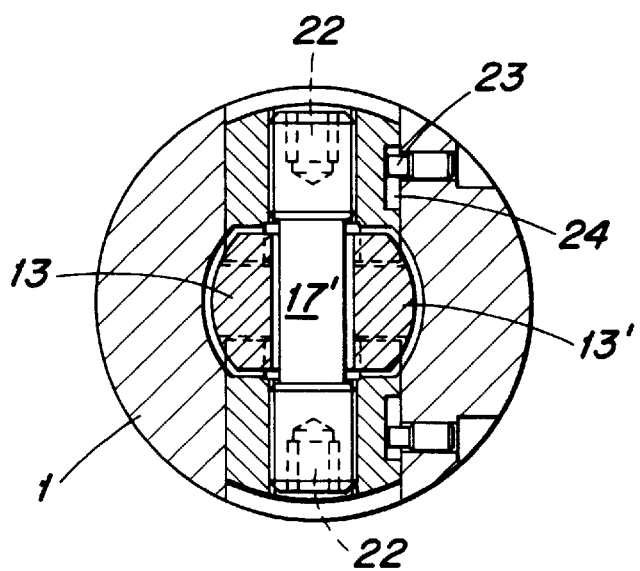
FIG. 3 is a cross-section taken along line A—A in FIG. 2.

In FIGS. 1–3 reference numeral 1 designates a holder and reference numeral 2 designates an adapter. The holder 1, in practice called a basic holder, includes a rear portion 3 that is intended to be connected to a machine tool, for instance a multi-purpose lathe, and a forward portion 4, to which the adapter 2 is to be connected. The adapter in turn is constituted by a cutting head having at least one seat 5 for receiving a cutting insert or a machining element (not shown) for chip removing machining. At a rear end surface of this cutting head (hidden in FIG. 1) a first serration 6 is provided (see also FIG. 2). A corresponding serration 7 is provided at a forward end surface of the essentially cylindrical holder 1. This forward end surface extends perpendicular to the central longitudinal axis of the holder.

As so far described, the disclosed tool coupling features are essentially known on one hand from commercially available couplings of the type COROMANT CAPTO® and on the other hand from Publication WO 93/10929 and German Document No. 3 026 513, respectively.

In accordance with the present invention a longitudinal first hole 8 is recessed in the holder 1, said hole 8 opening in the forward end containing the serration 7, and a second hole 9 is recessed in a cylindrical side surface of the holder 1, said second hole 9 extending transverse to said first hole 8. Preferably the second hole extends radially, i.e., at a right angle to the first hole. In the second hole 9 a clamping mechanism 10 of a quick coupling type is accommodated, the features of said clamping mechanism being described more in detail with reference to FIGS. 2 and 3.

A pulling member or drawbar, generally designated by reference numeral 11, projects longitudinally from the serration 6 at the rear side of the adapter, said pulling member being intended to be inserted into the hole 8, more precisely in order to co-operate with the clamping mechanism 10. Although it is feasible to design the pulling member 11 as an integral part of the adapter itself, it is preferred to manufacture the same as a separate body that is connected with the frame of the adapter, for instance via a thread coupling. Thus, in FIG. 2 it is indicated how the essentially plug-shaped pulling member 11 in the area of one of its ends has an external thread 12 that is tightened in an internal thread in a central hole in the adapter. In the area of its opposite end the pulling member is provided with two shank-like portions 13, 13' that are separated by a slot 14. Each one of these shank-like portions has upper and lower sets of serrated projections 15 defined by teeth defined by wedge surfaces 16 that are inclined relative to the axial extension of the plug. The clamping mechanism 10 comprises in a known way (see Hoffman et al. U.S. Pat. No. 4,725,173) a screw 17 having axially separated, external threads 18, 18' of reverse helix, i.e., one is a left-hand thread and the other one is a right-hand thread. These threads are in engagement with internal threads disposed in respective holes formed in two nuts 19, 19' that are axially moveable to-and-fro in the through-going hole 9 in the holder. As is evident from FIG. 3, an intermediate, unthreaded portion 17' of the screw 17 is located between the two shanks 13, 13' of the pulling member 11, said unthreaded portion 17' extending between the two threaded portions 18, 18'. The two sides of the nuts 19, 19' facing each other are provided with serrated projections 20 that are analogous with the serrated projections 15 in the sense that each serrated projection has two inclined wedge surfaces 21. Since one of the two threads 18, 18' of the screw 17 is a right-hand type thread and the other one is a left-hand type thread, the two nuts 19, 19' will approach each other when the screw is rotated in one direction and become distanced from each other when the screw is rotated in the opposite direction. In order to enable rotation of the screw, key recesses 22 (for instance of the Allen key type) are provided in each of the two opposite ends of the screw. This means that the screw may be rotated by means of a key that can be applied to an arbitrary end of the screw. This may in practice facilitate the operation of the screw when the holder is mounted in a narrow space where only one side of the holder is accessible.

As is clear from FIG. 2, the pitch P of the first and second teeth (defined by the wedge surfaces 16, 17) is greater than the pitch p of the first and second serrations 6, 7, and is also more than double the depth d of the serrations 6, 7.

From FIG. 3 it is evident how each nut 19, 19' is guided by means of a pin 23 that engages an axial groove 24 in the body. The pin 23 allows the nut to move axially at the same time as a rotation of the same is prevented when the screw is rotated. In this connection it should be pointed out that special sealings (not shown) may be arranged between the outer side of the individual nut and the inner side of the hole 9, more precisely in order to prevent liquid leakage from the central, axial hole 8. In such a way the last-mentioned hole may be used for feeding cooling liquid to the cutting head.

Reference is now made to FIG. 4 that illustrates a preferred embodiment of the individual serration 6, 7. This serration comprises several oblong ridges or beads 25 which are parallel to each other and separated by grooves 26. The top of the individual bead 25 is truncated, preferably by a planar surface 27 of considerable width. Each groove 26 is essentially V-shaped in cross section by being defined by two inclined flank surfaces 28, 28' and a rounded bottom 29. The angle v° between the flank surfaces 28, 28' is acute and should be within the interval 45–75°. In the disclosed example the angle v°=60°. The height of the ridges should in practice be within the area 0.3–1.0, preferably 0.50–0.75 mm. When the ridges of one of the serrations engage the grooves of the other serration the tops of the ridges should not contact the bottom of the grooves in order to guarantee that the respective ridges are effectively wedged into the adherent grooves. As is evident from FIG. 1 the serration 7 extends over the entire annular surface that is defined between the central hole 8 and the periphery of the cylindrical holder portion 4. In a corresponding way the serration 6 extends over the entire surface that is defined between the central pulling plug 11 and the cylindrical envelope surface of the cutting head 2.

When the cutting head 2 is to be connected with the holder 1 the clamping mechanism 10 is initially adjusted so that the pulling plug 11 may be received. This is effected by rotating the screw 17 in the direction that makes the nuts 19, 19' move away from each other a suitable distance. In the next step the pulling plug 11 is inserted into the hole 8 and pushed to an inner end position where the two shank portions 13, 13' are located on respective sides of the middle portion 17' of the screw simultaneously as the serrated projections 20 of the nuts are at least approximately located in the area between two corresponding serrated projections 15 of the shank portions 13, 13'. In this condition the screw is rotated in the opposite direction and the nuts approach each other. In doing so, the inwardly facing wedge or flank surfaces 16 of the serrated projections 15 will abut the analogous, outwardly facing wedge or flank surfaces 21 of the serrated projections 20 in order to urge, by edge action, the pulling plug 11 in a direction into the hole when the nuts are further tightened against each other. This in turn urged the ridges of the serration 6 into the grooves of the serration 7 in which they are wedged by a large force. Between the cutting head and the holder a torque resistant connection is achieved, said connection having a high reliability.

When the cutting head is to be removed from the holder in connection with a tool exchange, the nuts 19, 19' are distanced from each other and then the cutting head may be removed from the holder.

Apart from providing a robust and reliable connection between the cutting head and the holder, the tool coupling according to the invention has the advantage that the clamping mechanism always stays with the holder without having to be removed from the same, as is the case with detachable screws. Thus, the nuts 19, 19' are permanently maintained in the transverse hole 9 and they can only be moved to the outer end positions that are defined by the pins 23. Another advantage is that the screw 17, included in the clamping mechanism, and the key recesses 22 in the screw 17 are located at a considerable distance from the cutting insert of the cutting head. In practice this means that chips that are cut by the cutting insert do not tend to get stuck in the key recesses and complicate the screwing.

Reference is now being made to FIG. 5 showing how a certain spacing body 30, if needed, may be applied between the holder 1 and the cutting head 2. This spacing body may be cylindrical or tubular and has at opposite ends serrations of which a first one 6' surrounds a pulling member 11' while the other one 7' surrounds a first hole 8' in the spacing body. Analogous to the previous embodiment the spacing body includes a transverse hole 9' in which a clamping mechanism 10', of the same design as previously described, is accommodated. From FIG. 5 it should be evident that the spacing body 13 may be connected with the holder 1 by means of the pulling member 11' and the clamping mechanism 10 accommodated in the holder, and that the cutting head 2 is allowed to be connected with the spacing body by means of the pulling member 11 and the clamping mechanism 10' accommodated in the spacing body. With the help of this spacing body the cutting head 2 and the associated cutting insert may be located at a considerable distance from the basic holder. This distance is of course defined by the length of the spacing body.

Figure 6:
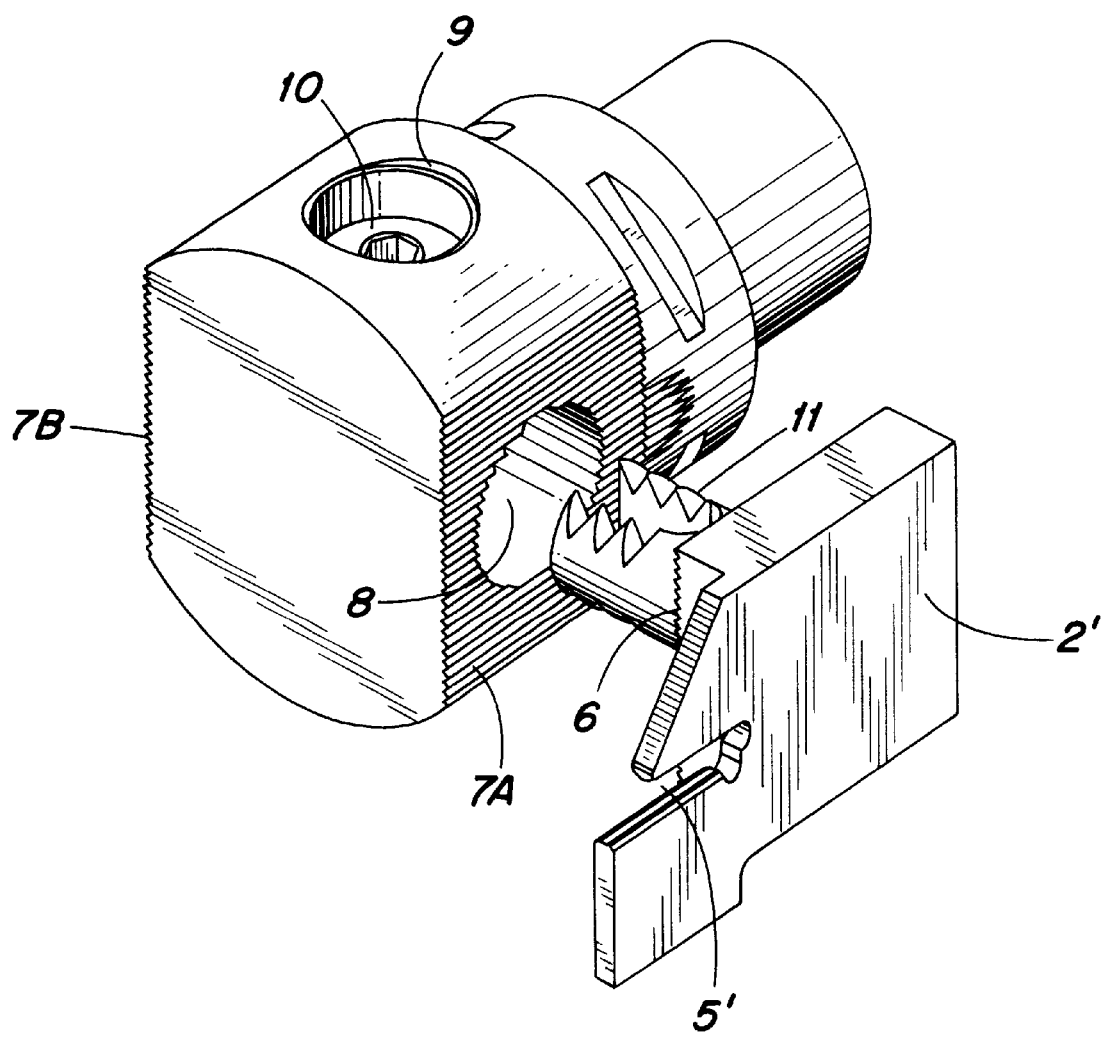
FIG. 6 is a perspective exploded view showing a second, alternative embodiment of the holder of the coupling.

In FIG. 6 an embodiment is illustrated where the holder 1 comprises two opposite serrations 7A, 7B, more precisely serrations that are provided on opposite sides of the holder. In the disclosed example the two serrated surfaces are parallel to each other, although it is also feasible to locate them at an angle relative to each other, for instance diverging in a direction rearwards from the forward front surface. In this case the adapter 2' constitutes a blade or disc shaped frame having a seat 5' for an insert of the kind used for, e.g., parting operations. Said frame has, on one side, a serration 6, from which a pulling member 11, of the kind previously described, projects. The pulling member 11 may be received in hole 8 that opens in the serration 7A and extends to the transverse hole 9 of the clamping mechanism 10. In an analogous way a hole (non-visible) extends from the serration 7B to the transverse hole 9. In other words the hole 9 is common for the two holes 8 that open in the serrated surfaces 7A, 7B and thus the same clamping mechanism 10 may be used for fastening of an adapter regardless if the adapter is applied on one side or the other of the holder.

Figure 7:
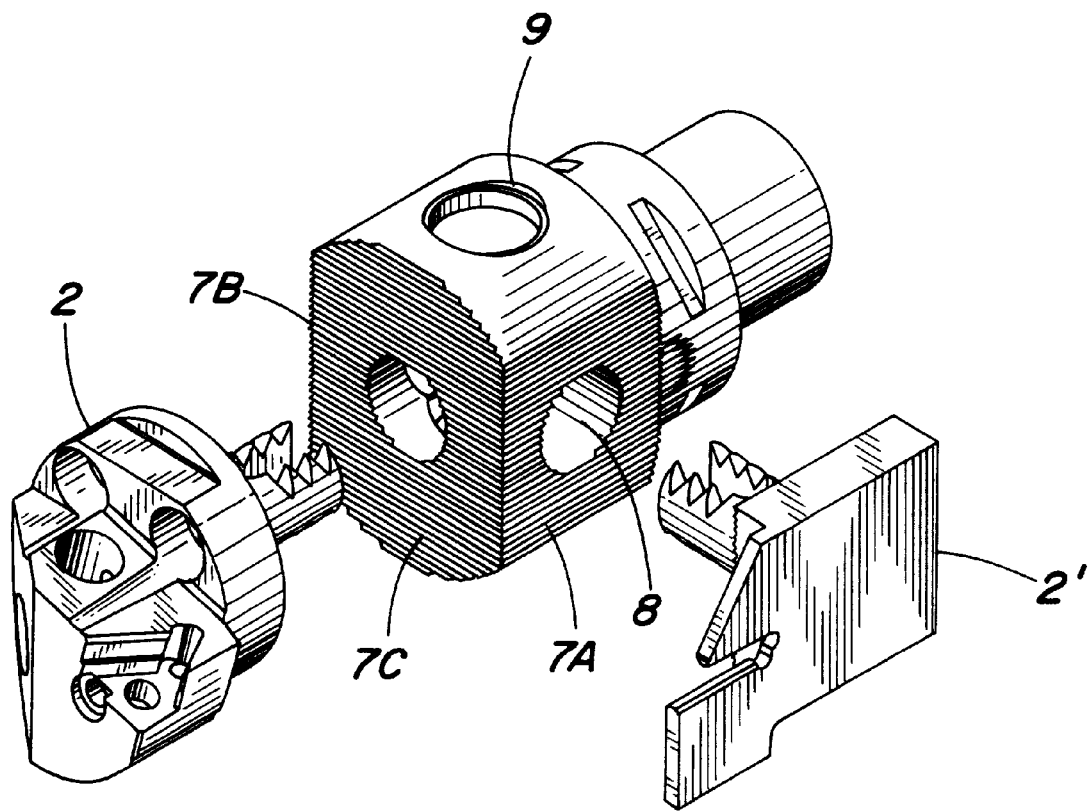
FIG. 7 is a similar exploded view showing a further, developed embodiment of the holder.

In FIG. 7 an especially preferred embodiment of the invention is illustrated where the holder 1, apart from the serrations 7A, 7B on opposite sides, also has a third serration 7C at the front surface of the holder. In this embodiment the adapters may, for instance any one of the adapters 2, 2' that are exemplified in the drawing, be applied to the holder in one of the three different positions. This means that the holder forms a universal basic holder having flexible application possibilities.

Feasible Modifications of the Invention

The invention is not solely restricted to the embodiments described and disclosed in the drawings. Thus it is possible to apply the invention in connection with both holders as well as adapters of a different physical shape than the ones exemplified. It is also feasible to use other types of clamping mechanisms than the one exemplified in FIGS. 2 and 3 although this one is preferred in practice. Thus it is feasible to resort also to other clamping mechanisms that use wedge action, i.e., mechanisms that include one or more wedge surfaces that upon axial displacement in the transverse hole cause a pulling member to move axially in the first hole by cooperation with analogous wedge surfaces of the pulling member. It is also feasible to use clamping mechanisms that work with eccentric bodies.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool coupling comprising:

a first body including a first surface having a first serration formed therein, a first hole extending through the first surface and defining a first axis, and a side surface having a second hole extending therethrough and intersecting the first hole and defining a second axis, the first surface oriented at a ninety degree angle with respect to the first axis;

a second body including a second surface facing the first surface and including a second serration configured to mesh with the first serration, the second surface oriented at a ninety degree angle with respect to the first axis the second body further including a pulling member projecting from the second surface and extending into the first hole, the pulling member including a plurality of first teeth; and a clamping mechanism disposed in the second hole and including a clamp member movable toward and away from the pulling member, the clamp member including a plurality of second teeth arranged to engage the first teeth to displace the second body toward the first body in a manner bringing the first and second serrations into meshing engagement with one another;

a pitch of the first and second teeth being greater than a pitch of the first and second serrations, and being more than double a depth of the first and second serrations, a depth of the first and second teeth being greater than the depth of the first and second serrations.

2. The tool coupling according to claim 1 wherein the clamping mechanism includes a screw extending in the second hole and having a thread, the clamp member comprising a nut threadedly disposed on the thread of the screw for movement toward and away from the first hole in response to rotation of the screw.

3. The tool coupling according to claim 1 wherein the first body includes another surface having additional serrations, and a third hole extending through the additional surface transversely of the second hole for receiving a pulling member.

4. The tool coupling according to claim 3 wherein the third hole is aligned with the first hole.

5. The tool according to claim 3 wherein the third hole extends transversely of the first hole.

6. The tool coupling according to claim 3 wherein the first body includes a further surface having further serrations, the third hole also extending through the further surface.

7. The tool coupling according to claim 1 wherein the first body comprises a holder, and the second body comprises an adaptor having a seat for receiving a cutting insert.

8. The tool coupling according to claim 1 wherein the first body comprises a spacer and the second body comprises an adaptor having a seat for receiving a cutting insert, and further including a holder, the holder including a serrated holder surface having a holder hole extending therein, the spacer including a serrated spacer surface facing the serrated holder surface and a spacer pulling member extending into the holder hole, the spacer pulling member having at least one wedge surface, the holder including a transverse hole extending transversely of the holder hole and intersecting the holder hole, there being at least one holder screw disposed in the transverse hole, and a holder nut threadedly disposed on the holder screw, the holder nut having at least one wedge surface engageable with the at least one wedge surface of the spacer pulling member.

* * * * *